United States Patent [19]

Lacroix

[11] 4,334,216
[45] Jun. 8, 1982

[54] ELECTRONIC DEVICE FOR MONITORING THE OPERATION OF A SERVO SYSTEM INCLUDING A HYDRAULIC JACK

[75] Inventor: Michel A. B. Lacroix, Velizy, France

[73] Assignee: Le Materiel Telephonique Thomson-CSF, Colombes Cedex, France

[21] Appl. No.: 92,548

[22] Filed: Nov. 8, 1979

[30] Foreign Application Priority Data

Nov. 22, 1978 [FR] France ............................. 78 32904

[51] Int. Cl.³ ............................................. G08B 21/00
[52] U.S. Cl. ............................... 340/679; 91/363 A; 318/565; 340/686
[58] Field of Search ............. 340/679, 686; 91/363 A; 137/554; 60/399, 329, 328; 318/565

[56] References Cited

U.S. PATENT DOCUMENTS

| | | | |
|---|---|---|---|
| 3,440,504 | 4/1969 | Boskovich et al. | 318/565 |
| 3,489,889 | 1/1970 | Escobosa | 91/363 A |
| 3,724,330 | 4/1973 | Mason | 91/363 A |
| 4,059,960 | 11/1977 | Osborne | 340/686 |
| 4,153,865 | 5/1979 | Cohen et al. | 318/565 |
| 4,191,913 | 3/1980 | Arnold et al. | 318/565 |

FOREIGN PATENT DOCUMENTS 2431912 1/1976 Fed. Rep. of Germany.

*Primary Examiner*—Glen R. Swann, III
*Attorney, Agent, or Firm*—Karl F. Ross

[57] ABSTRACT

A hydraulic jack for the controlled displacement of a load, such as a platform used in the training of aircraft pilots, has a servo valve normally settable by an error signal Ve from an actuator including a subtractor followed by an amplifier, the subtractor emitting the error signal as the difference between an externally generated position-control signal Vc and a position-feedback signal Vx sent out by the jack. A monitoring device includes an error detector which generates a safety signal AL disconnecting the servo valve from its actuator whenever the position-feedback signal Vx deviates excessively from a reference signal V'x derived from the position-control signal Vc by means of a simulation circuit whose transfer constant equals, in first approximation, that of the servo system encompassing the jack and the actuator. In addition to several cascaded operational amplifiers, the last of which is an integrator representing an electronic model of the jack, the simulation circuit may include a component responsive to a force-proportional output signal Vp from sensors attached to the jack for limiting the dynamic range of an intermediate signal V's supplied to the integrating operational amplifier, the output signal Vp being also degeneratively fed to the subtractor of the actuator to stabilize the operation of the system.

5 Claims, 7 Drawing Figures

ELECTRONIC DEVICE FOR MONITORING THE OPERATION OF A SERVO SYSTEM INCLUDING A HYDRAULIC JACK

FIELD OF THE INVENTION

My present invention relates to an electronic device for monitoring the operation of an actuator for a hydraulic jack, e.g. one used in simulators for training aircraft pilots.

BACKGROUND OF THE INVENTION

The function of pilot-training simulators is to reproduce as faithfully as possible the conditions of a true cockpit or flight deck. In particular, the simulated cabin is placed on a moving platform, so that the trainee feels the physical sensations corresponding to the movements of the aircraft. This platform is accelerated in rotation and translation and these movements are transmitted to it by hydraulic jacks provided with actuators whose construction is dependent on the degree of faithfulness with which the movements of the aircraft are to be reproduced.

In a known simulator arrangement, the simulator cabin is mounted on a platform supported by a device with six jacks placed on a base, the jacks essentially occupying the edges of an octahedron. The respective extension and retraction strokes of the jacks are controlled by a computer and determine in a relatively complicated manner the accelerations required for the platform. Each jack and the associated hydraulic and electrical actuating means form an assembly designated hereinafter by the term servo system.

The faithfulness of the accelerations obtained depends on a correct operation of the servo systems. It is often difficult to determine in a qualitative manner any deterioration in performance by simply observing the movements of the jacks and by interpreting the more or less subjective sensations felt by anyone in the cabin. In particular, the defective servo system can be relatively difficult to identify. Safety is also dependent on a correct operation of the jack. In order to guarantee the quality of the resulting movements, facilitate maintenance and contribute to safety, it would appear necessary to monitor the operation of each of the servo systems in an independent and accurate manner. Deterioration of the operating characteristics is mainly due to fouling of the servo valve settable for alternately advancing and retracting the jack together with its load, a rough-running point in the operation of the valve slide, or a defect in a transducer sensing the displacement of the jack.

This displacement is usually commanded by an externally generated position-control signal which is subtractively combined with a position-feedback signal sent back by the jack, the actuating means being responsive to an error signal which corresponds to the difference between the two position signals. Thus, the actuating means will generally comprise a subtractor working into an amplifier which transmits the amplified error signal to the servo valve. It is also known to provide monitoring means responsive to deviations between the position-feedback signal and a reference signal, derived from the position-control signal, for disabling the actuating means whenever these deviations exceed a predetermined tolerance range.

U.S. Pat. No. 3,724,330 describes a system with two electro-hydraulic servo valves whose transfer characteristics are duplicated by a pair of electrical models forming part of the aforementioned monitoring means. It has further been proposed (see U.S. Pat. No. 4,153,865) to compensate for the velocity-lag error of the jack by suitably modifying the monitoring signal. The generation of a velocity-proportional signal bucking the monitoring signal has also been described in German open application (Offenlegungsschrift) No. 2,431,912 published Jan. 15, 1976.

OBJECTS OF THE INVENTION

The general object of my present invention is to provide improved means for monitoring the operation of a servo system of the type referred to.

A related object is to provide means in such a system for stabilizing its operation and preventing any untimely disabling of the jack-actuating means by the monitoring means.

SUMMARY OF THE INVENTION

In accordance with the present invention I provide, as part of the monitoring means, a simulation circuit with a transfer function which is a first-order approximation of the transfer function of the combination of the jack and its actuating means, this circuit including an integrating operational amplifier whose time constant substantially equals the response time of the jack. An error detector of the monitoring means has one input receiving the position-feedback signal from the jack and another input receiving the aforementioned reference signal from the simulation circuit, specifically from the integrating operational amplifier thereof; the latter, advantageously, is in cascade with two further components of that circuit, namely with a subtractor and an amplifier which are functionally analogous to the subtractor and the error amplifier of the actuating means.

Pursuant to another advantageous feature of my invention, the jack is provided with sensing means emitting a force-proportional output signal which is degeneratively fed to the subtractor of the actuating means and to a limiter inserted between the second amplifier and the integrating operational amplifier of the simulation circuit, the limiter deriving from that output signal two force-related voltages and imposing them upon an intermediate signal, supplied by the last-mentioned amplifier, as upper and lower limits of its dynamic range.

BRIEF DESCRIPTION OF THE DRAWING

The above and other features of my present invention will become clear from the following description of a representative embodiment, given with reference to the accompanying drawing wherein.

SPECIFIC DESCRIPTION

Figure 1:
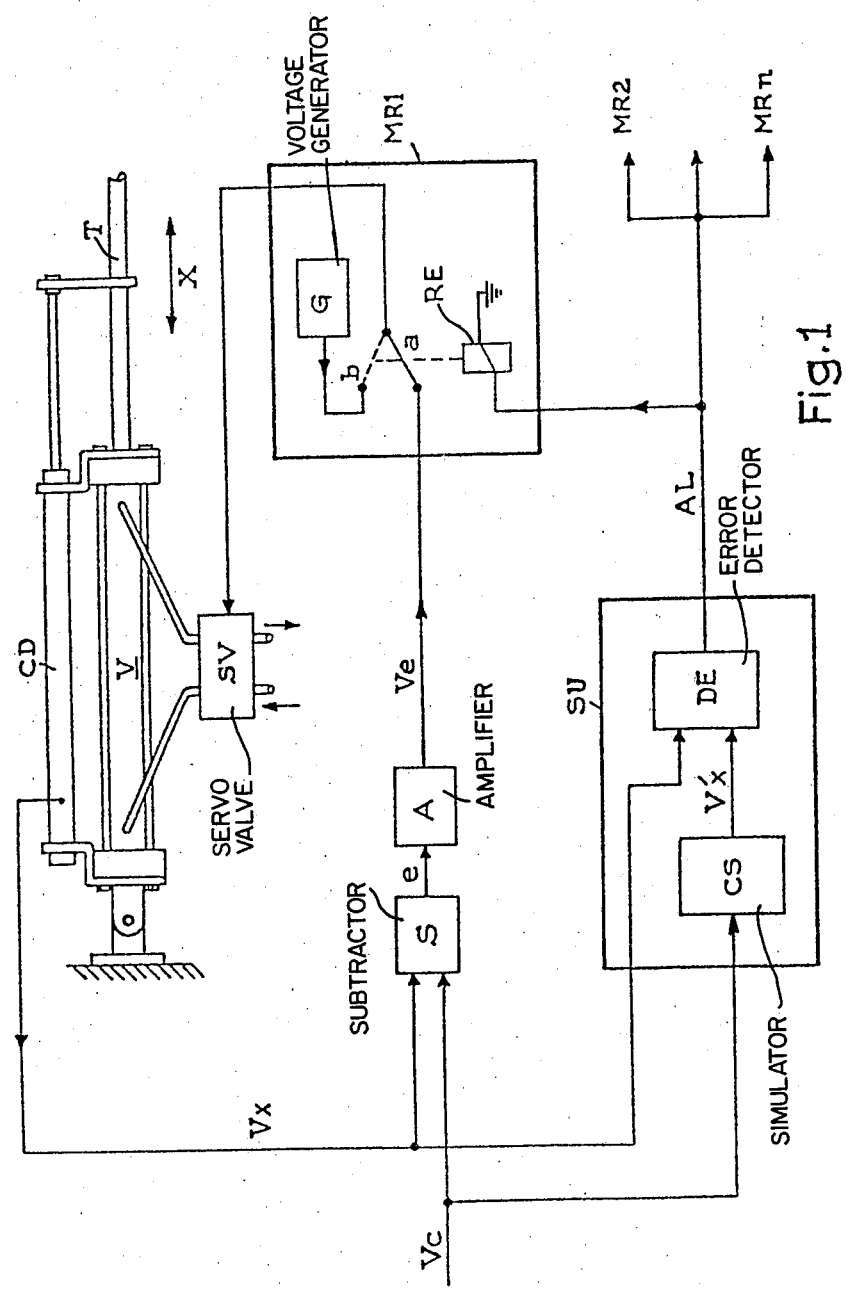
FIG. 1 is a diagram of the combination of a monitoring device according to the invention with a conventional servo system.

The servo system shown in FIG. 1, known per se, constitutes a position controller of the simplest type. It is responsive to a position-control signal Vc, whose amplitude is proportional to the travel X to be imposed on a rod T of a jack V that is hydraulically controlled by a servo valve SV to which is applied an error signal Ve emitted by an amplifier A. The stroke X is mechanically transmitted to a displacement sensor CD which supplies a position-feedback signal Vx proportional to that stroke. A subtractor S receives the signals Vx and Vc and emits an error signal e whose amplitude is equal to the difference of the respective amplitudes of these two signals. Amplifier A converts the error signal e into the amplified error signal Ve. The latter is applied to servo valve SV via a switchover device MR1. This conventional device is formed, for example, by a relay RE having two positions a and b and by a voltage generator G. When jack V is operating, the armature of relay RE is in position a. The servo valve SV is then supplied with signal Ve. When a cabin-supporting platform elevated by jack V is to be lowered, the armature of relay RE is placed in position b. Servo valve SV is then energized with a continuous signal supplied by generator G. The polarity of this signal corresponds to the direction of retraction of jack rod T. The simple servo system is designed for a small and sufficiently damped jack, yet in the case of a large jack with a hydrostatic bearing it could obviously be supplemented by conventional stabilization means. The switchover device MR1 is controlled by a safety signal AL supplied by a monitoring device SU according to my invention.

The monitoring device SU comprises a simulation circuit CS and an error-detection circuit DE. The simulation circuit CS receives the signal Vc and supplies a reference signal V'x which represents the theoretical displacement of the jack rod. The signal V'x is derived from the signal Vc and from the basic theoretical operating characteristics of the servo system. The error-detection circuit DE receives the reference signal V'x as well as the position-feedback signal Vx and generates the safety signal AL. In the embodiment described, this signal is applied to the switchover device MR1 of jack V, as well as to similar devices MR2 . . . MRn associated with the other jacks of the training simulator. The safety signal is constituted, in normal operation of the servo system, by a voltage which maintains the armatures of relay RE and its counterparts in the several devices MR1 to MRn in position a. This voltage is eliminated when the amplitude difference between the signals Vx and V'x exceeds the permitted limits, thereby placing the armatures of the relays in position b.

Figure 2:
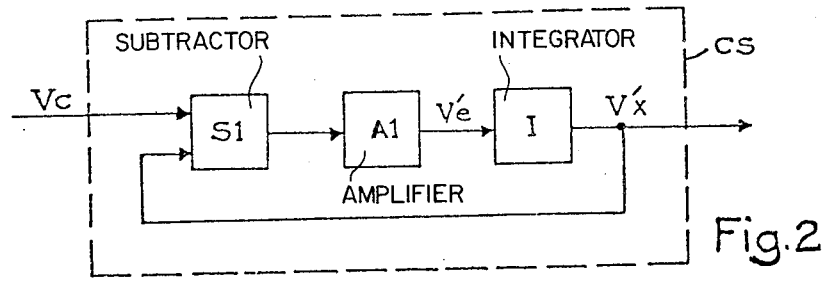
FIG. 2 is a diagram of a simulation circuit included in the monitoring device.

A detailed diagram of simulation circuit CS is shown in FIG. 2. This circuit is an electronic model whose transfer function is a first-order approximation of the transfer function of the combination of jack V and its actuator S, A. Simulator CS comprises elements S1, A1 and I with transfer functions respectively analogous to those of subtractor circuit S, amplifier A and jack V shown in FIG. 1. All these elements are formed by conventional integrated operational amplifiers. Circuit I is an integrating circuit whose time constant is substantially identical with the response time of jack V. Subtractor S1 has inputs respectively receiving the externally generated position-control signal Vc in parallel with circuit S and the reference signal V'x fed back from integrator I via an internal loop. Amplifier A1 emits a signal V'e analogous to error signal Ve.

Figure 3:
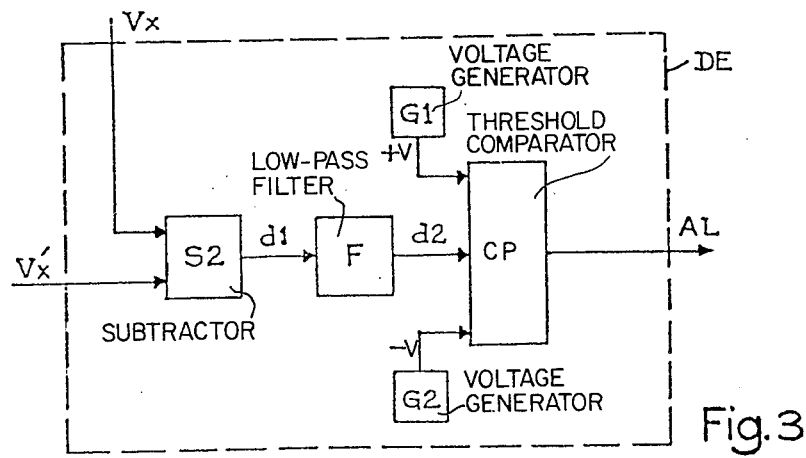
FIG. 3 is a diagram of an error-detection circuit also included in that device.

The diagram of the error-detection circuit DE is shown in FIG. 3. A subtractor S2 receives signals Vx and V'x and emits a signal d1 whose amplitude is equal to the difference between the amplitudes of these two signals. A low-pass filter F receives the signal d1 and converts it into a signal d2, suppressing frequencies close to the resonant frequency of the system for which the amplitudes of the true transfer function and its first-order approximation would widely differ. A comparator CP receives signal d2, as well as two threshold voltages $+V$ and $-V$ respectively supplied by two generators G1 and G2 and corresponding to the positive and negative limits of a tolerance range which must not be exceeded by the amplitude of signal d2 if operation is to be considered correct. Threshold comparator CP supplies the safety signal AL, a voltage present when the amplitude of difference signal d2 is between thresholds $+V$ and $-V$ but absent when that amplitude exceeds one or the other of these thresholds. Circuit S2 is designed as an integrated operational amplifier. Circuit CP can be purchased commercially. The two generators G1 and G2 can be formed by resistance bridges. The low-pass filter F is an active filter also comprising an operational amplifier.

The aforedescribed monitoring device operates completely satisfactorily only if the maximum speed of the jacks is never reached. However, in normal use it is possible for the servo system to reach its speed-saturation state for a certain period of time. Although this phenomenon entails no fault on the part of the servo system and only results, for example, from a particular control mode, the signals Vx and V'x differ immediately, which leads to the emission of a safety signal causing undesired stopping of operation.

Figure 5:
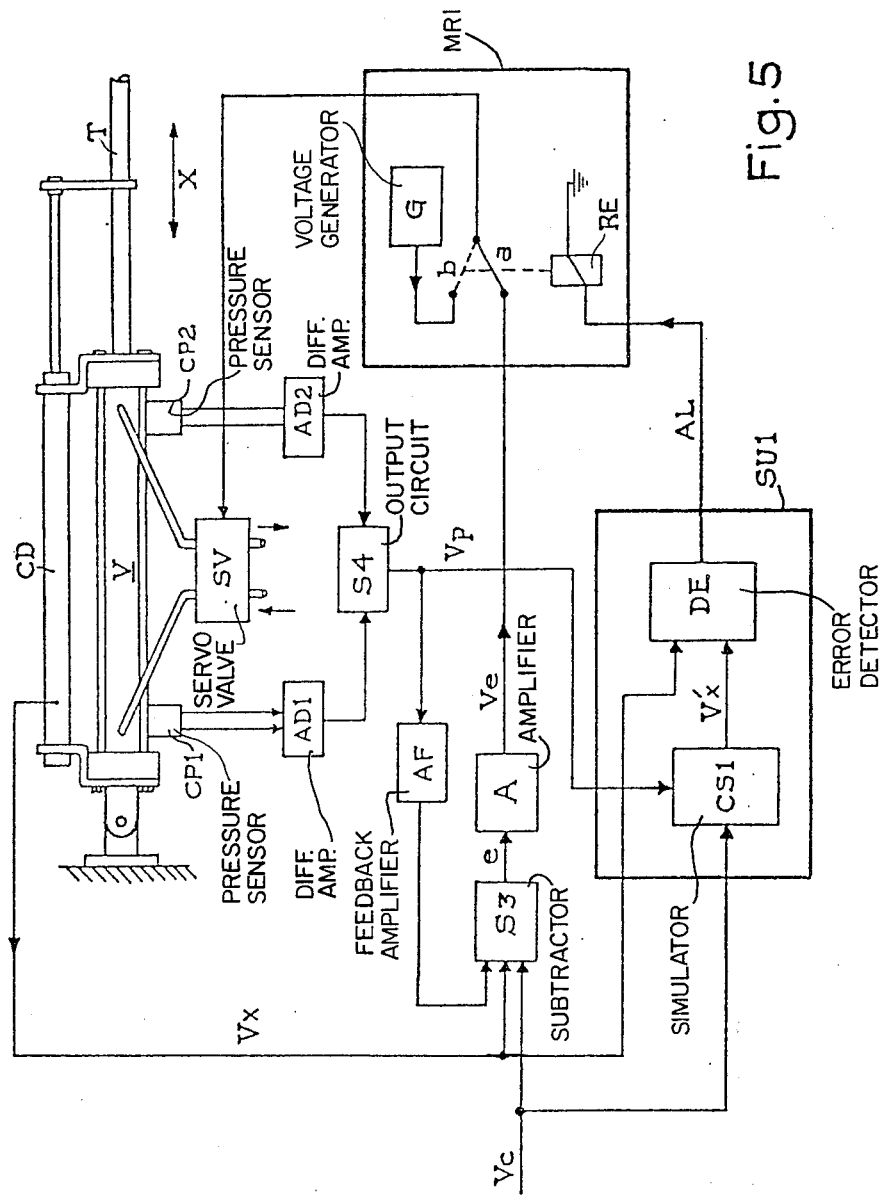
FIG. 5 is a diagram of the combination of a modified monitoring device according to my invention, including the simulation circuit of FIG. 4, with the servo system of FIG. 1 supplemented by a stabilization circuit responsive to the force produced by the jack.

An improved monitoring device according to my invention, shown in FIG. 5, takes into account the possible saturation of the servo system and prevents the untimely activation of the switchover device MR1. This system includes a conventional stabilization circuit responsive to the force F (cf. FIG. 7) exerted by the jack. Two pressure sensors or transducers CP1 and CP2, comprising strain gauges and working into two differential amplifiers AD1 and AD2, measure the pressures of the two chambers of the jack on opposite sides of its piston. The two signals so obtained are applied to an output circuit S4 which emits a signal Vp proportional to the force F. After suitable processing and amplification in a circuit AF forming part of a negative-feedback loop, this signal is degeneratively applied to subtractor S3 which corresponds to circuit S of FIG. 1 and emits the error signal e to be converted by component A into the amplified signal Ve fed to device MR1. This force-responsive signal Vp is advantageously utilized for stabilizing the operation of the servo system by simulating a saturation effect varying as a function of load. For this purpose, a modified monitoring device SU1 comprises an error detector DE, identical with that of device SU described hereinbefore, and a simulation circuit CS1 which receives the signals Vc and Vp.

Figure 4:
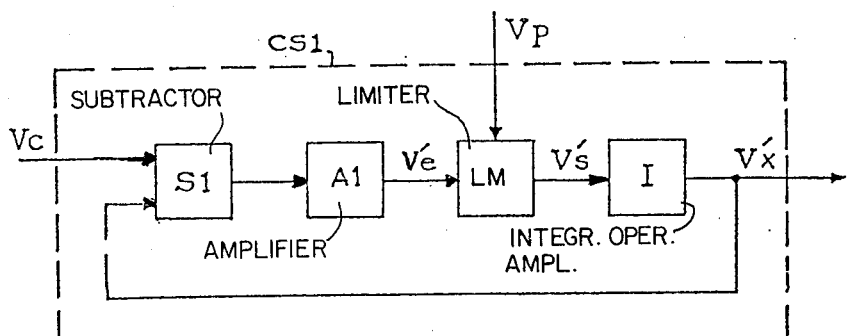
FIG. 4 is a diagram of a modification of the simulation circuit shown in FIG. 2.

The diagram of circuit CS1 is shown in FIG. 4. The simulation circuit CS1 differs from circuit CS of FIG. 1 by the insertion of a range limiter LM between amplifier A1 and integrator I. This limiter receives the signal V'e supplied by amplifier A1, as well as the output signal Vp of circuit S4, and feeds an intermediate signal V's of limited dynamic range to integrator I.

Figure 6:
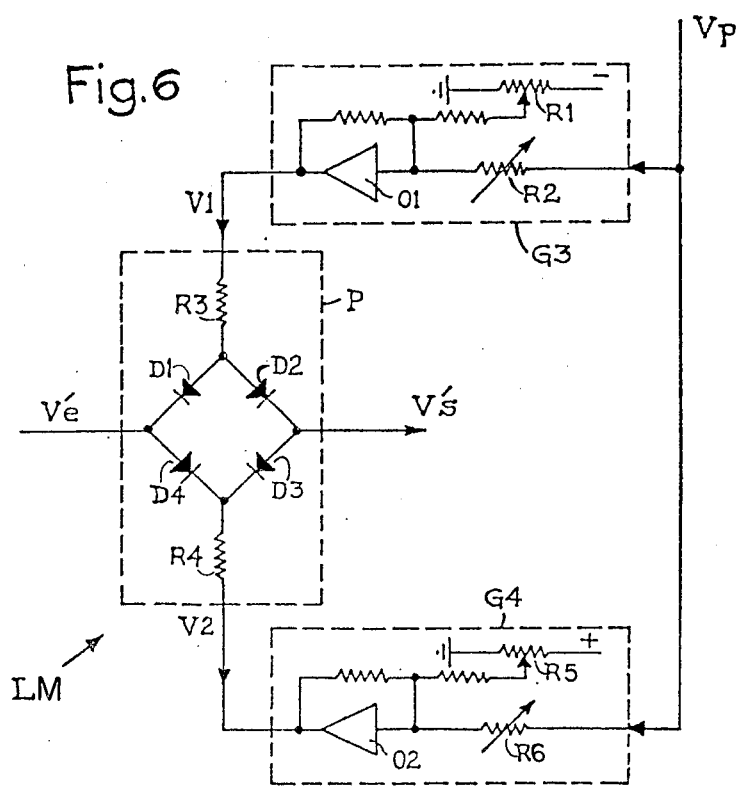
FIG. 6 is a detailed diagram of a range limiter included in the simulation circuit of FIG. 4.

The detailed diagram of range limiter LM is shown in FIG. 6. The diodes D1, D2, D3 and D4 of a conventional rectifier bridge P receive biasing current from two voltage generators G3 and G4 connected to two opposite corners of the bridge via two resistors R3 and R4. Signal V'e is applied to one of the two other corners of bridge P whereas the intermediate signal V's supplied to integrator I is taken from the fourth bridge corner. The voltages V1 and V2 supplied by generators G3 and G4 respectively define the range limits of signal V's corresponding to the speed saturation of the servo system during extension and retraction of the jack rod T.

Figure 7:
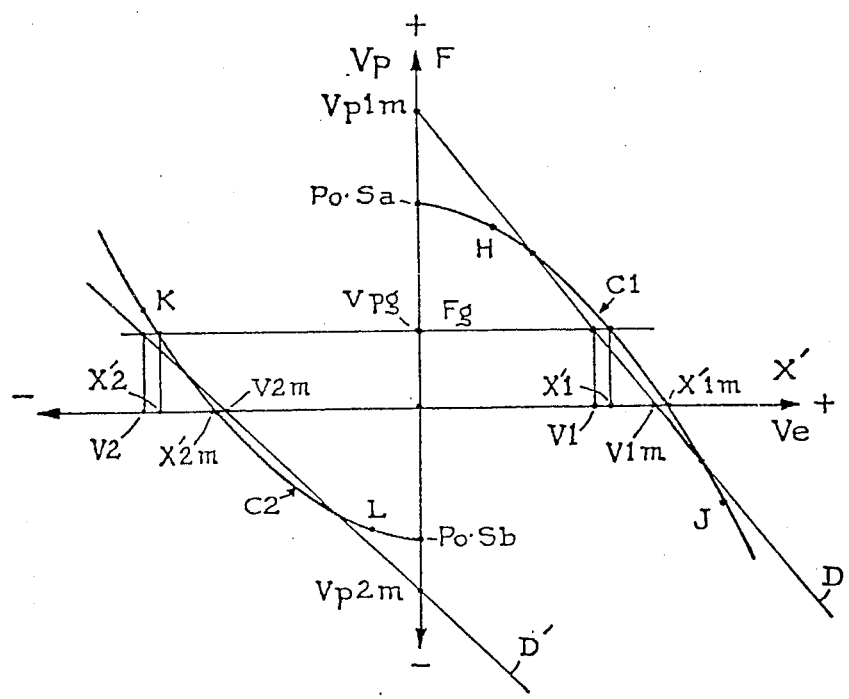
FIG. 7 is a graph of speed-saturation curves of the servo system of FIG. 5, designed to facilitate comprehension of the operation of the range limiter of FIG. 6.

The graph of FIG. 7 helps explain how the electrical operation of range limiter LM can simulate, in a sufficiently accurate manner, the hydraulic operation of the servo system. The two curves C1 and C2 represent the limiting speed X' acquired by the jack rod as a function of the force F exerted by the jack. Curve C1 corresponds to the extension of the rod whereas curve C2 corresponds to its retraction. The equations of these curves are respectively:

$$F = Po \cdot Sa - Pn(Sa^3 + Sb^3)X'^2/2Qn^2$$

$$-F = Po \cdot Sb - Pn(Sa^3 + Sb^3)X'^2/2Qn^2$$

In these equations Po represents the pressure of the hydraulic liquid; Sa and Sb are the useful surface areas of the asymmetrical piston; and Pn and Qn are the nominal pressure and the nominal flow rate of the servo valve given by the manufacturer. A force Fg and two maximum speeds, namely an extension speed X'1 and a retraction speed X'2, correspond, for example, to an external load applied to the jack V. When the force Fg reaches value Po·Sa or Po·Sb, speed X' is 0. When this force is 0, the speeds cannot exceed the values X'1m and X'2m. The amplitude of signal Vp and that of signal Ve controlling the servo valve have been plotted on the ordinate and the abscissa respectively corresponding to speed X' and force F. In operation, force Fg varies within the useful zones HJ and KL of curves C1 and C2. In order to simulate the hydraulic operation of the servo system and more particularly the speed saturation simulated by range limiter LM, these parts of the curves closely approach portions of straight lines and the operating equations of the range limiter are represented by straight lines D and D' whose slopes are given by two coefficients k1 and k2. These straight lines are respectively defined by force points Vp1m and Vp2m for zero speed and by speed points V1m and V2m for zero force. The corresponding values can be measured graphically. With the aforementioned extension speed X'1 and retraction speed X'2 corresponding to force Fg, the limiting voltages V1 and V2 from generators G3 and G4 (FIG. 6) correspond to the resulting signal Vpg and are given by the following equations:

$$V1 = V1m - k1 \cdot Vpg$$

$$V2 = V2m + k2 \cdot Vpg$$

The generators G3 and G4, emitting these voltages as linear functions of speed signal Vp, each comprise an operational amplifier 01, 02 whose input voltage is determined by two adjustable resistors R1, R2 and R5, R6. Resistors R1 and R5 are adjusted in such a way that V1 and V2 are respectively equal to V1m and V2m when Vp is zero. Resistor R2 is adjusted in such a way that V1 is equal to 0 when Vp is equal to Vp1m. Resistor R6 is adjusted in such a way that V2 is equal to zero when Vp is equal to Vp2m. By letting curves C1 and C2 approximate the straight lines D and D' suitably positioned with respect thereto, the speed X' at which saturation is simulated by an amplitude limitation of signal V's differs by a maximum of ±10% from the speed at which saturation actually occurs.

What is claimed is:

1. In a servo system including a hydraulic jack provided with a servo valve settable for alternately advancing and retracting said jack together with a load engaged thereby, actuating means for setting said servo valve in response to the difference between an externally generated position-control signal and a position-feedback signal from said jack, and monitoring means responsive to deviations between said position-feedback signal and a reference signal derived from said position-control signal for disabling said actuating means upon said deviations falling outside a predetermined tolerance range, the improvement wherein said monitoring means comprises a simulation circuit receiving said position control signal at its input and supplying said reference signal at its output, said simulation circuit having a transfer function which is a first-order approximation of the transfer function of the combination of said jack and said actuating means, said simulation circuit including an integrating operational amplifier whose time constant substantially equals the response time of said jack, said monitoring means further including an error detector with one input receiving said position-feedback signal from said jack and with another input receiving said reference signal from said simulation circuit and supplying at its output a safety signal which disables said actuating means whenever the signals at its inputs differ by more than a predetermined amount.

2. A servo system as defined in claim 1 wherein said actuating means comprises a first subtractor with inputs respectively receiving said position-control and position-feedback signals and a first amplifier inserted between said first subtractor and said servo valve, said simulation circuit further including a second subtractor functionally analogous to said first subtractor and a second amplifier functionally analogous to said first amplifier connected in cascade with said operational amplifier, said second subtractor having one input receiving said position-control signal and another input receiving said reference signal over an internal feedback loop from the output of said operational amplifier.

3. A system as defined in claim 2 wherein said jack is provided with sensing means emitting a force-proportional output signal degeneratively fed to said first subtractor, said simulation circuit further comprising limiting means inserted between said second amplifier and said operational amplifier, said limiting means being connected to said sensing means for deriving two force-related voltages from said output signal and imposing same as upper and lower range limits upon an intermediate signal supplied to said operational amplifier.

4. A system as defined in claim 3 wherein said limiting means comprises a diode bridge with a pair of opposite corners respectively receiving said force-related voltages and with a third corner connected to an output of said second amplifier, a fourth corner of said bridge being connected to an input of said operational amplifier.

5. A system as defined in claim 1, 2, 3 or 4 wherein said error detector comprises subtraction means deriving a difference signal from said position-feedback and reference signals, a comparator receiving said difference signal from said subtraction means through an active low-pass filter, and voltage-generating means supplying said comparator with upper and lower voltage limits for said tolerance range.

* * * * *